US012792552B2

(12) United States Patent
Juneja et al.

(10) Patent No.: US 12,792,552 B2
(45) Date of Patent: Nov. 10, 2026

(54) PERIPHERAL COMPONENT INTERFACE ENGINE(S) FOR EXTERNAL RESOURCE SCHEDULING WITHIN A CLOUD-BASED ENVIRONMENT

(71) Applicant: Oracle International Corporation, Redwood City, CA (US)

(72) Inventors: Rohit Juneja, Stittsville (CA); Sandesh Pai, Chelmsford, MA (US); Pardhiva Janardhana Krishna Munnaluru, Apex, NC (US)

(73) Assignee: Oracle International Corporation, Redwood City, CA (US)

( * ) Notice: Subject to any disclaimer, the term of this patent is extended or adjusted under 35 U.S.C. 154(b) by 171 days.

(21) Appl. No.: 18/789,200

(22) Filed: Jul. 30, 2024

(65) Prior Publication Data

US 2026/0037470 A1 Feb. 5, 2026

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC .................... G06F 13/4221; G06F 2213/0026
See application file for complete search history.

(56) References Cited

U.S. PATENT DOCUMENTS

| | | | | |
|---|---|---|---|---|
| 12,069,128 | B2 * | 8/2024 | Einkauf | G06F 9/5077 |
| 2004/0225772 | A1 * | 11/2004 | Eichler, Jr. | G06F 13/423 710/200 |
| 2022/0405135 | A1 * | 12/2022 | Sehgal | G06F 9/5016 |
| 2023/0195383 | A1 * | 6/2023 | Gole | G06F 3/067 711/154 |

* cited by examiner

*Primary Examiner* — Henry Tsai
*Assistant Examiner* — Kim T Huynh

(57) ABSTRACT

Various embodiments of the present technology generally relate to a peripheral component interface (PCI) engine and its related functions. In an example, a method is provided for managing availability of external resources utilized by worker nodes within a containerized software environment. The external resources may be provided to respective worker nodes through PCI slots on a device driver. The method may include determining, by a PCI engine, a usage count for each worker node, where the usage count includes a number of PCI slots for a respective worker node consumed by the external resources. The method may also include determining, by the PCI engine, an allocability count for a first worker node based on the usage count and publishing, by the PCI engine, a PCI availability of the first worker node to a scheduler associated with the containerized software environment based on the allocability count.

20 Claims, 6 Drawing Sheets

PERIPHERAL COMPONENT INTERFACE ENGINE(S) FOR EXTERNAL RESOURCE SCHEDULING WITHIN A CLOUD-BASED ENVIRONMENT

TECHNICAL FIELD

Various embodiments of the present technology generally relate to improvements to the capabilities of a software container environment, such as Kubernetes® (sometimes stylized as K8s). More specifically, embodiments of the present technology relate to systems and methods for improved network functionality in a cloud-based environment, such as to implement a peripheral component interface (PCI) engine that allows for improved scheduling of external resources within a cloud-based environment.

BACKGROUND

In the modern era, organizations are increasingly relying on cloud-native architectures, and as such, they are turning to containerized software deployment and orchestration platforms like Kubernetes. These platforms are essential for managing the complex lifecycle of containerized applications, providing capabilities such as automated deployment, scaling, and operations across clusters of hosts. They ensure that applications are highly available and resilient by distributing workloads, monitoring the health of applications, and performing automatic restarts and failovers when necessary. Additionally, they simplify resource management and optimize the use of computing power, enabling organizations to run applications efficiently and cost-effectively. With the growing demand for speed, scalability, and reliability in software development and deployment, containerized orchestration platforms have become a cornerstone of modern IT infrastructure.

Current containerized software platforms, like Kubernetes, struggle significantly with scheduling external resources. While these platforms are adept at managing and orchestrating containerized applications, they encounter substantial challenges when it comes to integrating and effectively utilizing resources such as GPUs, FPGAs, and specialized hardware. The dynamic nature of these external resources complicates their seamless integration into the scheduling process. Standard Kubernetes schedulers are not inherently designed to handle the specific requirements and constraints of these specialized resources, leading to inefficiencies and suboptimal resource utilization. Additionally, maintaining performance consistency, compatibility, and security across diverse hardware environments adds layers of complexity. Despite efforts to develop plugins and custom schedulers, the process remains convoluted and often requires manual intervention, preventing Kubernetes from fully leveraging the potential of external resources.

Accordingly, there is a need for improved systems and techniques to effectively and efficiently integrate external resources into the containerized software environment. In particular, there is a need for peripheral component interface (PCI) engines as provided herein for monitoring and managing PCI slots associated with external resources to allow for incorporating the external resources into scheduling processes of the platform.

The information provided in this section is presented as background information and serves only to assist in any understanding of the present disclosure. No determination has been made and no assertion is made as to whether any of the above might be applicable as prior art with regards to the present disclosure.

OVERVIEW

Technology is disclosed herein for systems and techniques for providing a peripheral component interface (PCI) engine for managing scheduling of external resources, such as virtual network interface controller or cards (Vnics) and local volumes, within containerized software environments. In an aspect, a method may include deploying a PCI engine in a pod within a cluster of worker nodes of a containerized software environment, such as Kubernetes. Once deployed, the PCI engine may determine a usage count for each worker node within the cluster or a subset of worker nodes within the cluster. The usage count may include a number of PCI slots that are currently consumed by one or more external resources and/or a respective application deployed on the cluster. In some cases, the PCI engine may use a collector service deployed on a pod within each respective worker node to monitor the usage count for each respective node.

Based on the usage count, the PCI engine may determine an allocability count for each worker node. The allocability count may be based on the usage count and a capacity count of an underlying device driver for each worker node. Specifically, the allocability count may indicate the number of PCI slots that are available for scheduling within that respective worker node. Based on the allocability count, the PCI engine may publish a PCI availability for the respective worker node to a scheduler associated with the cluster. In some cases, publishing the PCI availability may include updating a node status associated with the worker node to reflect the allocability count.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
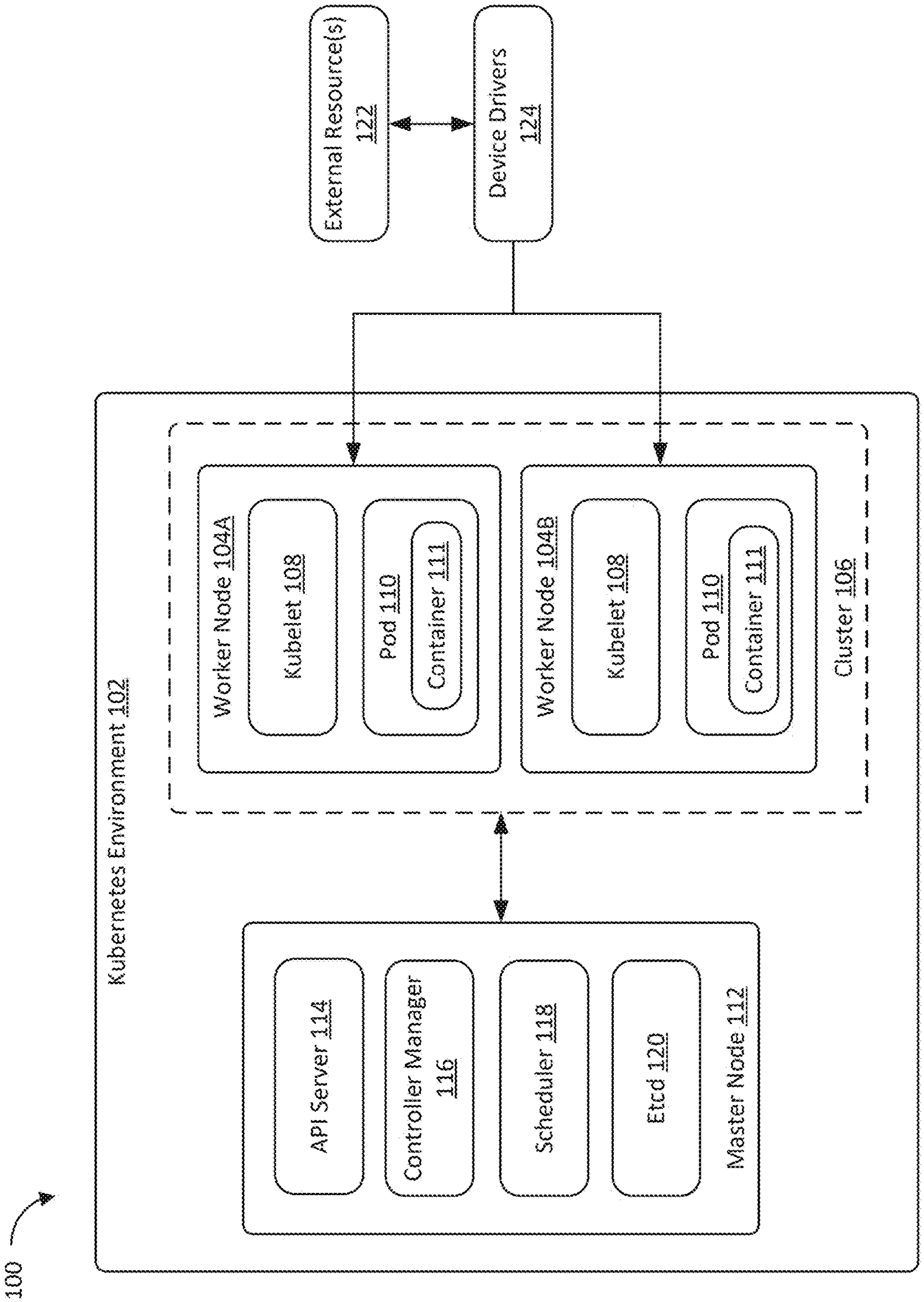
FIG. 1 provides an example system illustrating an example containerized software environment, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Containerized software environments, exemplified by platforms like Kubernetes, are experiencing a surge in popularity for several compelling reasons. Firstly, they offer unparalleled agility and scalability, allowing developers to package applications and their dependencies into portable, lightweight containers that can run consistently across various environments. This consistency streamlines the development, testing, and deployment processes, accelerating time-to-market and enhancing operational efficiency. Additionally, containerization promotes resource utilization optimization, enabling organizations to maximize infrastructure investments and efficiently manage computational resources. Moreover, Kubernetes, with its robust orchestration capabilities, automates the deployment, scaling, and management of containerized applications, simplifying complex tasks and reducing operational overhead. This combination of flexibility, efficiency, and automation makes containerized software environments like Kubernetes indispensable in modern software development and deployment landscapes, driving their widespread adoption across industries.

Containerized software environments, such as Kubernetes, generally operate within a private network, utilizing standard resources for operations. These containerized software environments, however, enable the use of external resources through various mechanisms designed to extend its functionality and integrate with hardware outside the cluster. For instance, Kubernetes can leverage custom resource definitions (CRDs) to define and manage external resources, allowing users to create, configure, and monitor these resources within the Kubernetes environment. Additionally, these environments often support the use of device plugins, which facilitate the discovery, allocation, and management of external hardware such as GPUs, FPGAs, and specialized network interfaces. These plugins allow containerized software environments to expose hardware resources to containers as if they were native to the cluster. Furthermore, external resources can provide persistent volumes and storage classes to manage external storage systems for the containerized software environment, enabling stateful applications to access and persist data across different nodes. As can be appreciated, containerized software environments can leverage external resources to provide a flexible and extensible platform with enhanced containerized applications capabilities.

To integrate external resources into the containerized software environment, the containerized software environment often utilizes PCI slots on device drivers to incorporate the external resources into respective worker nodes. The PCI slots allow the nodes to interface with specialized hardware components. When a worker node is equipped with external devices like GPUs or network cards, the containerized software environment may utilize a device plugin framework. Device plugins are installed on the worker nodes and are responsible for advertising the availability of these resources to a respective scheduler present within the environment. The scheduler then becomes aware of the hardware resources available on each node, allowing it to make informed decisions when placing pods. When a pod requiring a specific hardware resource is scheduled, the device plugin ensures that the necessary drivers and configurations are applied, allowing the pod to access and utilize the hardware seamlessly. This integration is critical for high-performance computing tasks, machine learning workloads, and other resource-intensive applications that rely on specialized hardware for optimal performance. Overall, the integration and management of external resources through PCI slots and device drivers allow containerized software environments to effectively extend its capabilities and support a broader range of applications and workloads.

Containerized software environments, however, cannot fully integrate and utilize external resources to their full potential because of the lack of insight into the PCI availability of respective hardware devices. As noted above, external resources are often introduced into the containerized software infrastructure via a device driver containing PCI slots. As such, the external resources, along with CPU, memory, and storage requirements, may use multiple of the PCI slots on the device driver. The scheduler within the containerized software environment, however, may not have insight into the PCI slot capacity or availability. This lack of visibility can cause the scheduler to make scheduling decisions on inaccurate information, leading to suboptimal scheduling decisions. For example, the scheduler may assign a pod requiring a particular external resource to a node that does not have the necessary PCI slots available.

When a containerized software environment is unable to accurately account for the hardware availability and usage of external resources, several negative outcomes can arise. Firstly, it may lead to resource contention, where multiple pods compete for the same hardware resources, causing performance degradation and instability in the applications. This can result in failed deployments, as pods might be scheduled to nodes without the required hardware resources, leading to crashes or suboptimal performance. Additionally, the inability to account for hardware availability can lead to inefficient resource utilization, with some nodes being overburdened while others remain underutilized. This imbalance not only reduces the overall efficiency of the system but can also increase operational costs. Moreover, the lack of accurate hardware awareness complicates troubleshooting and maintenance, making it difficult for administrators to diagnose and resolve issues related to resource allocation. Ultimately, this limitation can hinder the scalability and reliability of applications running in a containerized software environment, impacting user experience and business outcomes.

To address at least the above shortcomings of current containerized software environments, in particular, integration of external resources into such environments, an example peripheral component interfaces (PCI) engine is provided herein. As will be described in greater detail below, the PCI engine may detect when an external resource is added to a respective device driver and update a respective allocability count of the device driver. The PCI engine may then publish a PCI availability such to inform the scheduler associated with the containerized software environment of the number of PCI slots that are available for use.

By dynamically updating the PCI availability for each respective device driver utilized by worker nodes within a cluster, the PCI engine provides the scheduler with visibility into the underlying hardware specifics. That is, the PCI engine ensures that the scheduler is operating on accurate resource information when making scheduling decisions, thereby optimizing the scheduler's allocation capabilities. When the scheduler can make scheduling decisions based on accurate information, such as PCI slot usage, it significantly enhances the efficiency and reliability of the cluster. Accurate scheduling ensures that pods are placed on nodes with the necessary hardware resources, preventing deployment failures and reducing resource contention. This leads to better performance and stability for applications that rely on external resources like GPUs and specialized network cards. Additionally, efficient utilization and integration of these resources maximize hardware investment, improve workload distribution, and enable containerized software environment to support a wider range of applications and workloads seamlessly.

Turning now to the Figures, FIG. 1 provides an example system 100 illustrating an example containerized software environment 102, according to an embodiment herein. The containerized software environment 102 may be a Kubernetes containerized software environment, and the system 100 may include one or more containerized software environments 102. As illustrated, a containerized software environment 102 may contain one or more clusters 106, which are collections of worker nodes 104A-B that work together to run containerized applications. Each cluster 106 may contain multiple worker nodes 104A-B, which are the machines (physical or virtual) where containers 111 are deployed and run. Each of the worker nodes 104A-B may contain a Kubelet 108 and one or more pods 110. The Kubelet 108 is an agent that runs on each worker node 104A-B and communicates with a master node 112 to ensure that the containers 111 are running as expected. As will be described below, the Kubelet 108 receives instructions from the master node 112 and manages the state of the pods 110 on its worker node, ensuring the pods 110 are healthy and running the correct containers 111.

The pods 110 are the smallest deployable units in a containerized software environment 102 like Kubernetes, encapsulating one or more containers 111 that share the same network namespace and storage. Each pod 110 represents a single instance of a running process in the cluster 106 and can host multiple containers 111 that need to work closely together. The pods 110 are ephemeral, meaning they can be created, destroyed, and recreated as needed, ensuring applications remain resilient and scalable. By organizing the containers 111 into the pods 110 and distributing them across the worker nodes 104A-B, the containerized software environment 102 ensures efficient use of resources, high availability, and ease of scaling for applications. It should be appreciated that while only two worker nodes 104A-B are illustrated in the cluster 106, in real world applications, the cluster 106 may contain more worker nodes 104A-B. Similarly, while the environment 102 illustrates the single cluster 106, in real applications the environment 102 may include multiple clusters 106.

Within the environment 102, the cluster 106 interacts and communicates with the master node 112, which may contain an API server 114, a controller manager 116, a scheduler 118, and an Etcd 120, to maintain the desired state and manage containerized applications. The API server 114 acts as the primary interface, handling all incoming requests from the cluster 106. When a new pod 104A-B needs to be scheduled, the API server 114 receives the request and passes it to the scheduler 118, which determines the most suitable worker node based on resource availability and constraints. The controller manager 116 continuously monitors the cluster's 106 state through various controllers, making adjustments to ensure the desired state is achieved, such as maintaining the correct number of pod replicas. The Etcd 120, a distributed key-value store, holds the cluster's 106 configuration and state data, providing a reliable source of truth that the other components in the cluster 106 reference and update. Through this coordinated interaction and communication, the master node 112 ensures the cluster 106 operates smoothly and efficiently, deploying applications, managing resources, and maintaining high availability.

In some embodiments, one or more external resources 122 may be integrated into the environment 102 to enhance its capabilities and support specialized workloads. As illustrated, the external resources 122 extend beyond the default infrastructure of the environment 102 and include hardware and services that are not native to the cluster 106. Examples of external resources include GPUs for high-performance computing tasks, FPGAs for custom hardware acceleration, and specialized network interfaces for enhanced networking capabilities, such as Virtual network interface cards (Vnics) and VnicSet operators as described in U.S. application Ser. No. 18/351,810, titled CLOUD BASED NETWORK FUNCTION, U.S. application Ser. No. 18/351,835, titled VIRTUAL IP FOR A CONTAINER POD, and U.S. application Ser. No. 18/351,861, titled CLOUD NETWORK SERVICE MANAGEMENT, each of which is incorporated by reference herein. In some embodiments, the external resources may include external storage systems, such as network-attached storage (NAS) or storage area networks (SANs), to provide persistent storage for stateful applications.

To integrate the external resources 122 into the environment's 102 infrastructure, the external resources 122 may be integrated through mechanisms like device plugins, persistent volumes, and custom resource definitions (CRDs), allowing applications running within the cluster 106 to leverage these additional resources 122 effectively for improved performance and functionality. Integrating the external resource 122 into the environment 102 involves several coordinated steps to ensure that the external resource122 is effectively recognized, registered, and utilized by the scheduler 118. The process begins with the installation of a respective device driver 124 on each of the worker nodes 104A-B. As will be described in greater detail below with respect to FIG. 2, the device drivers 124 installed on the worker nodes 104A-B may support multiple PCI slots that facilitate communication between the hardware components of the external resources 122, such as GPUs, network cards, or other specialized hardware, and the environment 102. In other words, the device drivers 124 installed on the worker nodes 104A-B manage the interaction between the external resources 122 and the environment 102, enabling proper functionality and integration of the external resources 122 within the cluster 106.

Following the installation of the device drivers 124, a corresponding device plugin is deployed. This plugin acts as an intermediary between environment 102 and the device driver 124, responsible for discovering the available hardware resources, interfacing with the device driver 124, and ensuring that the resources 122 are visible and accessible to the environment 102. The device plugin may register the external resources 122 with the Kubelet 108 running on each of the worker nodes 104A-B. The Kubelet 108, which is the primary agent that communicates with the master node 112 and manages the pods 110 on the nodes 104A-B, uses this information to make the external resources 122 available for scheduling by the scheduler 118.

In an illustrative example, the Kubelet 108 communicates with the API server 114 to report the available resources, including the external resources 122. The API server 114, serving as the central management entity in the cluster 106, receives these reports, updates the cluster state, and disseminates the information to other components within the cluster 106. With the external resources 122 registered and reported, the scheduler 118 becomes aware of the external resources 122 available on each of the worker nodes 104A-B. This awareness allows the scheduler 118 to make informed decisions when assigning pods 110 to the nodes 104A-B. For instance, when a pod 110 requiring a GPU for machine learning workloads is created, the scheduler 118 ensures that the pod 110 is assigned to a node 104A-B equipped with the necessary hardware.

Once the pod 110 is scheduled, it is deployed to the appropriate worker node 104A-B. The Kubelet 108 on that worker node 104A-B ensures that the pod 110 has access to the external resource 122 via the device driver 124. A device plugin may facilitate this access, enabling the application running within the pod 110 to utilize the hardware effectively. Thus, the integration process, from driver installation to resource utilization, enables environment 102 to manage and optimize the use of external resources 122, enhancing the capabilities of the workloads running within the cluster 106.

One shortcoming of the current external resource integration process, such as the above outline process, is the environment's 102 lack of insight into the PCI slot availability associated with a respective driver 124. That is, the scheduler 118 is unaware of the number of PCI slots available when assigning a pod 110 to a respective worker node 104A-B. This may be problematic when external resources 122 include custom operators and interfaces, such as Vnics and VnicSet Operators, or local volumes which consume PCI slots. The PCI slot usage is not exposed to the cluster 106, and as such the scheduler 118 cannot base its decisions on the current availability of PCI slots. Consequently, the scheduler 118 may assign pods 110 having a resource requirement that exceed the available PCI slot availability of the worker nodes 104A-B (e.g., the worker node's capacity), leading to potential allocation conflicts and deployment issues.

It should be appreciated that the term "PCI slot" used herein is meant to cover both PCI slots and PCI express slots. As those skilled in the art readily appreciate, a PCI slot is an older interface standard for connecting expansion cards to a motherboard, offering lower bandwidth and shared data paths among devices. In contrast, a PCI Express (PCIe) slot is a modern, high-speed interface that provides dedicated, serial data lanes for each device, enabling faster data transfer rates and improved performance. PCI slot type may be dependent on the type of device driver 124 being used.

Figure 2:
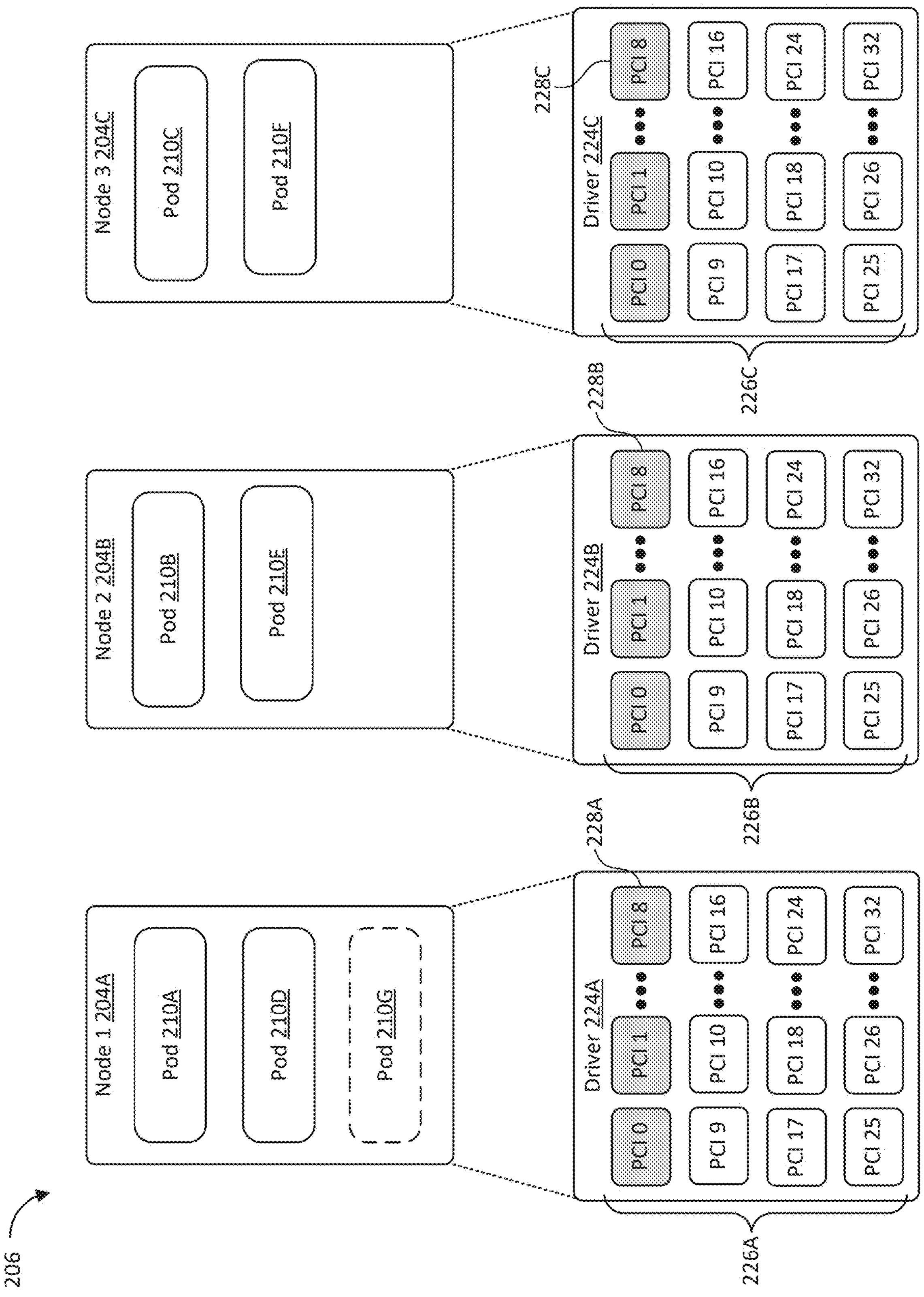
FIG. 2 illustrates an example cluster containing multiple worker nodes, according to an embodiment herein.

Referring now to FIG. 2, an example cluster 206 containing multiple worker nodes 204A-C is illustrated, according to an embodiment herein. The cluster 206 may be the same or similar to the cluster 106 and contain the worker nodes 204A-C, which may be the same or similar to the worker nodes 104A-B. As illustrated, each worker node 204A-C may have a respective device driver 224A-C installed thereon. Each of the device drivers 224A-C may contain multiple PCI slots 226A-C, respectively. The number of PCI slots 226A-C may vary depending on the type of device driver 224A-C. For example, one or more of the device drivers 224A-C may be a 440FX driver that has a max limit of 32 PCI slots available for the respective worker node 204A-C. In another example, one or more of the device drivers 224A-C may be a q35 driver that has no max limit of PCI slots, specifically PCI express slots. Instead, the number of PCI slots available on a q35 slot depends on the resources available on a respective worker node 204A-C. For ease of illustration, each of the device drivers 224A-C contains 32 PCI slots, however, it should be appreciated that in other embodiments, one or more of the device drivers 24A-C may contain a different number of PCI slots.

As noted above, the number of PCI slots available on the device drivers 224A-C is not exposed to the containerized software infrastructure, such as the environment 102. This lack of exposure can be problematic during scheduling because often one or more PCI slots on a device driver 224A-C are consumed by various external resources, such as custom operators and interfaces, and/or reserved for system usage. That is, one or more of the PCI slots 226A-C may be consumed by a respective platform's slot usage when hardware components, such as GPUs, network cards, and storage controllers, are installed into these slots. Similarly, when a customer interface, such as Vnic is injected into a respective worker node 204A-C, the Vnic consumes one or more of the PCI slots 226A-C. As such, a subset of the PCI slots 226A-C is generally consumed by one or more external resource (e.g., custom operators/interfaces) and/or consumed by a respective platform's hardware usage. This subset of PCI slots 226A-C is referred to herein as allocated PCI slots 228A-C.

Because the scheduler 118 is not exposed to or made aware of the allocated PCI slots 228A-C, the scheduler 118 may continue scheduling pods 110A-G onto the worker nodes 204A-C without accounting the reduced slot availability of the device drivers 224A-C. For example, each of the pods 210A-G may require 10 PCI slots. Since the scheduler 118 assigns pods 210A-G to worker nodes 204A-C having the most available resources with the cluster 206, the scheduler 118 may assign the pods 210A-F to the worker nodes 204A-C as illustrated. Since each of the illustrated drivers 224A-C contain 32 PCI slots, as illustrated, the scheduler 118 may assign the pod 210G to the worker node 204A. However, the device driver 224A may not have enough available PCI slots 226A to support the pod 210G. For example, as illustrated, of the device driver's 224A 32 PCI slots 226A, eight PCI slots may be allocated PCI slots 228A and 20 PCI slots 226 may be consumed by the pods 210A and 210D, leaving only 4 remaining PCI slots available on the device driver 224A. However, since the PCI slot availability of the drivers 224A-C is not exposed to the containerized software environment, the scheduler 218 is not aware that the device driver 224A does not have enough PCI slots 226A available to support the pod 210G.

When the pod 210G is assigned to the worker node 204A that lacks sufficient PCI slots 226A to support its requirements, several issues can arise. The pod 210G may fail to start or operate correctly due to the unavailability of the necessary hardware resources, such as GPUs or network interfaces, which are critical for its functionality. This mismatch can lead to deployment failures, as the scheduler 118 has allocated the pod 210G to the node 204A that cannot meet its resource needs. Additionally, if the pod 210G is part of a larger application or service, its failure can impact the overall performance and reliability of the application, causing disruptions and potentially affecting user experience. Furthermore, this scenario highlights inefficiencies in resource management, as the worker node's 204A capacity is not fully utilized, and the pod 210G may be left waiting for resources that are not available. Accordingly, effective resource planning and accurate visibility into PCI slot availability are essential to prevent such issues and ensure smooth operation within the cluster 206.

Figure 3:
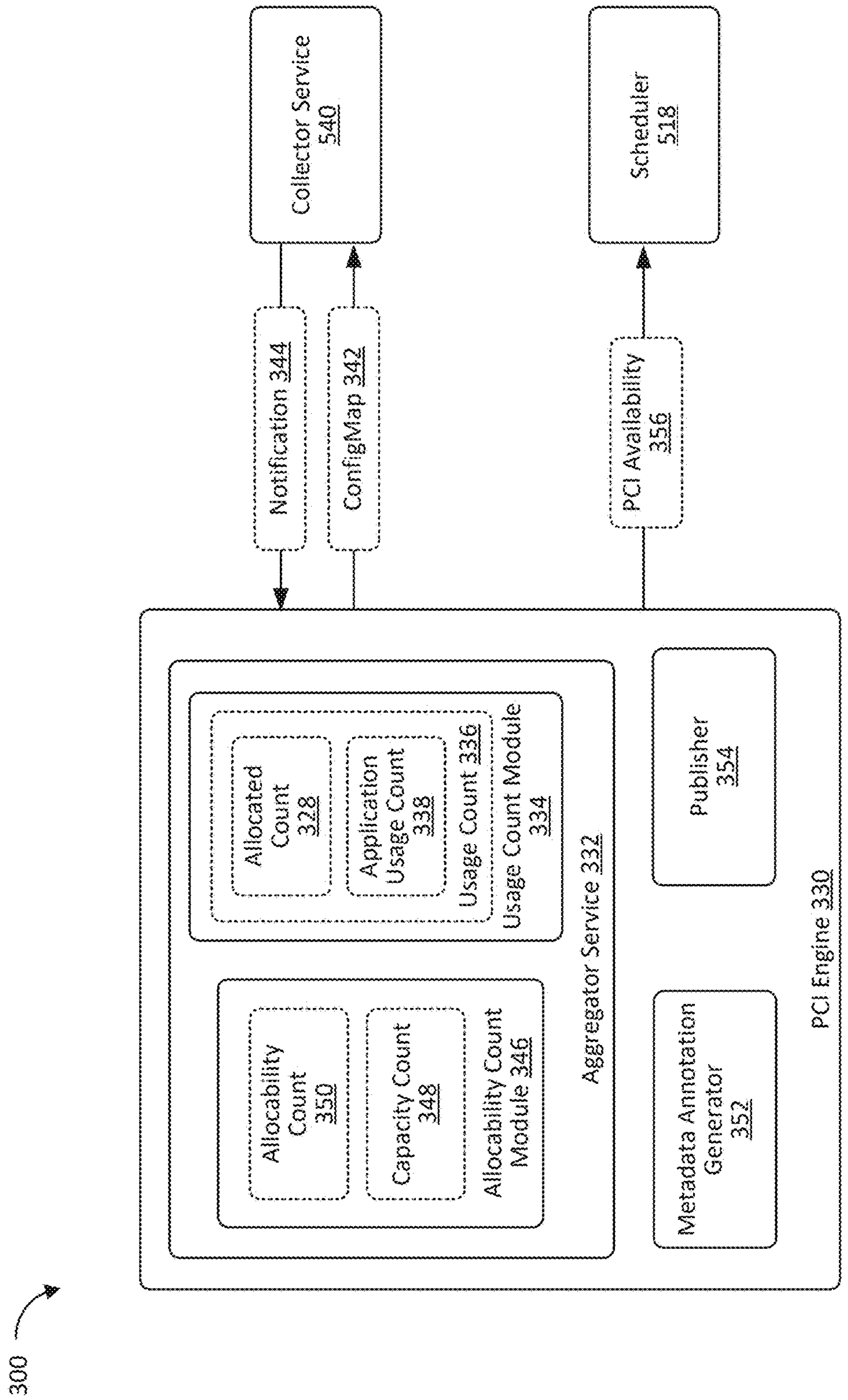
FIG. 3 illustrates an example PCI engine for managing and providing PCI slot availability within containerized software environments, according to an embodiment herein.
Figure 4:
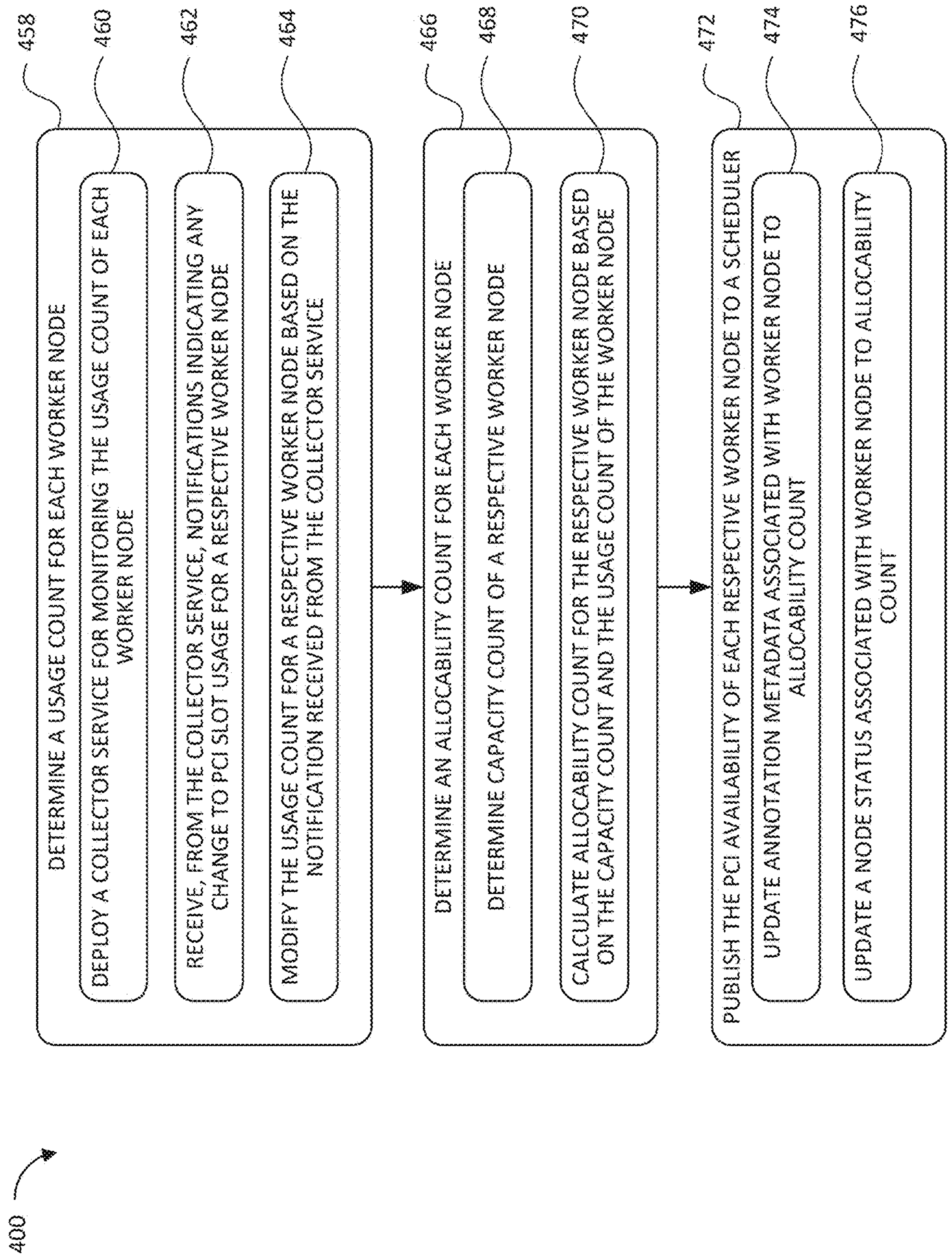
FIG. 4 illustrates an example process for providing a PCI engine and one or more of its functions, according to an embodiment herein.

To provide visibility of PCI slot availability to containerized software environments, such as Kubernetes, example PCI engine(s) are provided herein. Referring now to FIG. 3, an example PCI engine 330 for managing and providing PCI slot availability within containerized software environments is provided, according to an embodiment herein. For ease of illustration, FIG. 3 is described in relation to FIGS. 4 and 5. FIG. 4 illustrates an example process 400 for providing a PCI engine and one or more of its functions and FIG. 5 illustrates an example containerized software environment 500 in which a PCI engine is implemented within a containerized software environment, according to various embodiments herein.

Figure 5:
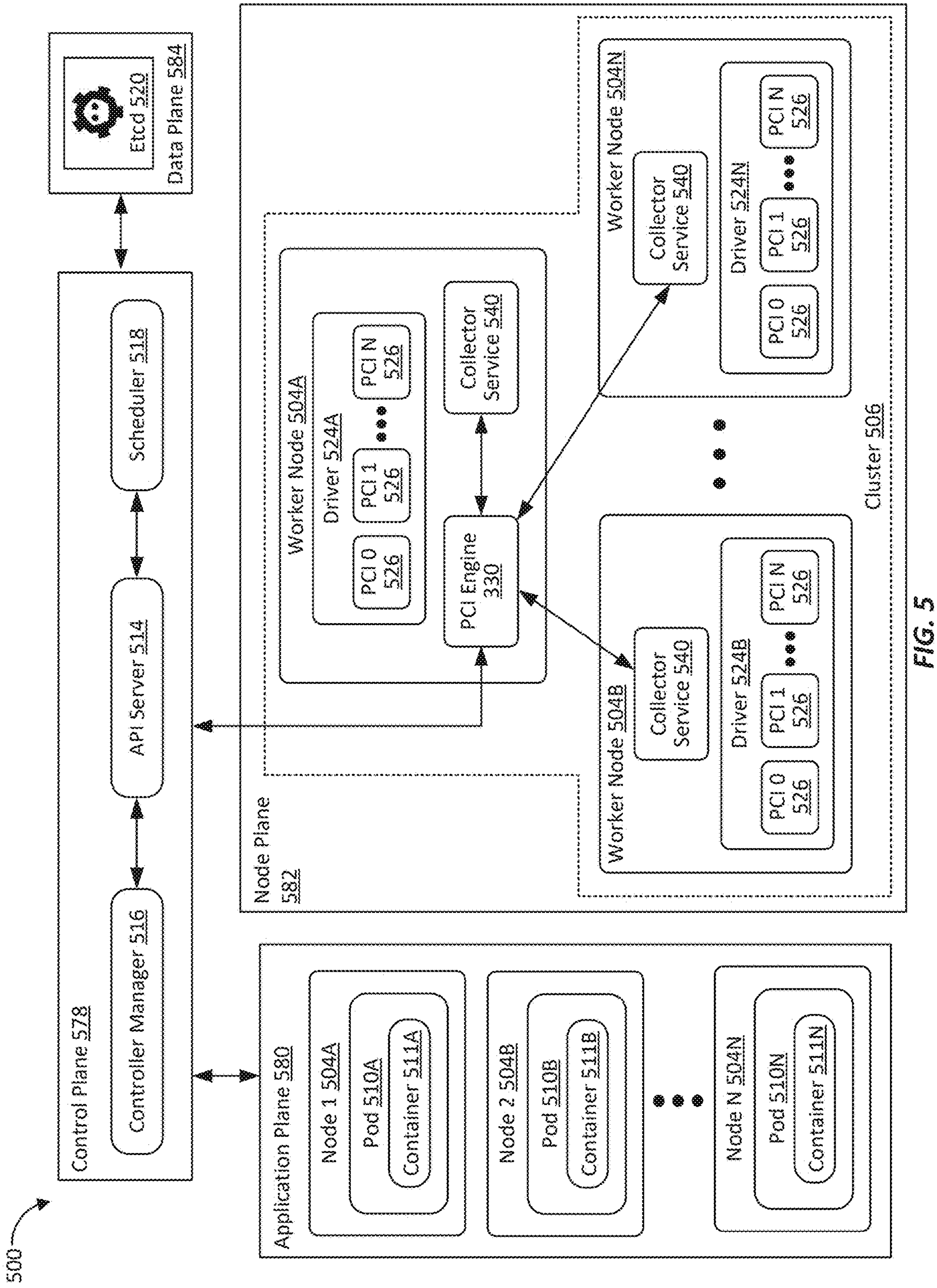
FIG. 5 illustrates an example containerized software environment, according to an embodiment herein.

The PCI engine 330 may be deployed within a containerized software environment, such as the environment 500 illustrated in FIG. 5. As illustrated in FIG. 5, the environment 500 includes a control plane 578, an application plane 580, a node plane 582, and a data plane 584. The control plane 578 may include a controller manager 516, an API server 514, and a scheduler 518, which may be the same or similar to the controller 116, the API server 114, and the scheduler 118, respectively. The data plane 584 may include an Etcd 520 which may be the same or similar to the Etcd 120. The node plane 582 may include worker nodes 504A-N that may be running in a cluster 506, which may be the same or similar to the cluster 106. Since the node plane 582 represents the infrastructure layer of the environment 500, the worker nodes 504A-N may provide the physical or virtual resources needed to run pods 510A-N that are executed on corresponding worker nodes 504A-N within the application plane 580. As such, the worker nodes 504A-N in the application plane 580 may represent the application layer for each of the worker nodes 504A-N, encompassing the deployment and management of the pods 510A-N that contain various containers 511A-N, which may be the same or similar to the containers 111.

As illustrated, the PCI engine 330 may be deployed within one of the worker nodes 504A-N, such as the worker node 504A. The PCI engine 330 may be configured to be in operational communication with the worker nodes 504A-N within a given cluster. Specifically, the PCI engine 330 may determine a usage count for each of the worker nodes 504A-N(458). With reference to FIG. 3, the PCI engine 330 may include an aggregator service 332 containing a usage count module 334. The usage count module 334 may determine a usage count 336 for the worker nodes 504A-N. In some cases, the usage count module 334 may determine a usage count 336 for each of the worker nodes 504A-B.

To determine the usage count 336 for the worker nodes 504A-N, the PCI engine 330 may utilize or deploy a collector service 540 within the environment 500 (460). Specifically, the PCI engine 330 may deploy the collections service 540 with a respective cluster, such as the cluster 506 for the worker nodes 504A-N. The collections service 540 may be a mechanism or function within the containerized software environment 500 that ensures that a particular pod runs on all or a specified subset of worker nodes 504A-N in the cluster 506. For example, the collections service 540 may be or include DaemonSets that the PCI engine 330 deploys for logging or monitoring the PCI slot usage for each of the worker nodes 504A-N within the cluster 506. When the collector service 540 is created, the scheduler 518 may automatically schedule a copy of the specified pod on every worker node 504A-N(or a subset of nodes 504A-N based on node selectors or affinities). This ensures that the collector service 540 has a presence on all relevant nodes 504A-N, as illustrated in FIG. 5, enabling the collector service 540 to gather comprehensive data on PCI slot usage across the entire cluster 506.

To deploy the collector service 540 to monitor the PCI slot usage of each worker node 504A-N within the cluster 506, the PCI engine 330 may create a ConfigMap 342. The ConfigMap 342 may include the configuration for a deployed collector service 540, specifying log file paths, log formats, and other relevant settings for monitoring the PCI slot usage. For example, the ConfigMap 342 may include a node name, such as NodeToCapacityPathMap as the key along with fields for a PCI Capacity value and a hostPath of a respective PCI device for each of the worker nodes 504A-N.

Below is an example of the ConfigMap 342:

```
apiVersion: v1
kind: ConfigMap
metadata:
  name: NodeToCapacityPathMap
data:
  worker1:|
    PCICapacity=32
    Hostpath="/sys/bus/pci/devices"
  worker2:|
    PCICapacity=64
    Hostpath="/sys/bus/pci_express/devices"
```

Once the ConfigMap 342 is defined, the PCI engine 330 may create the collector service 540 to use the ConfigMap 342. In the collector service's 540 pod specification, the ConfigMap 342 may be mounted as a volume, allowing the deployed collector service 540 within inside each pod to access the configuration. Each pod, running on a different node, such as pods 510A-N running on the worker nodes 504A-N, may use the configuration of the ConfigMap 342 to monitor the PCI slot usage from its respective node and forward the respective PCI slot usage to the PCI engine 330. Specifically, the collector service 540 running on each of the worker nodes 504A-N may forward respective PCI slot usage information to the aggregator service 332 of the PCI engine 330.

When deployed, the collector service 540 may determine the PCI slot usage by monitoring the number of PCI slots used by the respective worker node. Specifically, the deployed collections service 540 may monitor the host path defined in the ConfigMap 342 to identify any changes to the device drivers 524A-N. As noted above, two common device drivers 524A-N include the 440FX driver and the q35 driver. For the 440FX, the collector service 540 may monitor the host path "/sys/bus/pci/devices" and for the q35, the collector service 540 may monitor the host path "/sys/bus/pci_express/devices." As can be appreciated, the host path may vary depending on the type of device driver used. As the deployed collector service 540 monitors a respective worker node 540A-N, if an addition or deletion is detected via the host path, the collector service 540 may generate a notification 344 and send it to the PCI engine 330. For example, the collector service 540 deployed on the worker node 504B may detect the addition or deletion of a device or usage of a PCI slot on the driver 524B. Based on the change in usage of the PCI slot on the driver 524B, the collector service 540 may generate the notification 344 indicating the change to the PCI slot usage of the driver 524B and send the notification 344 to the aggregator service 332 of the PCI engine 330.

The PCI engine 330, specifically, the aggregator service 332 may receive the notification 344 from a respective deployed collections service 540 (462). Responsive to receiving the notification 344 the aggregator service 332 may determine the usage count 336 for the respective worker node. In some cases, the aggregator service 332 may modify the usage count 336 for the respective worker node based on the notification 344 (364). For example, the usage count module 334 may log previous usage counts for each of the worker nodes 504A-N and responsive to receiving the notification 344 modify the usage count for the respective worker node.

In some embodiments, the usage count 336 may include an allocated count 328 and an application usage count 338. As noted above, one or more of the PCI slots 526 may be allocated for or consumed by one or more external resources (e.g., custom operators/interfaces) and/or consumed by a respective platform's hardware usage. As such, the allocated count 328 may account for the PCI slots used by the allocated PCI slots. The application usage count 338 may account for the number of PCI slots used by a respective application being executed within the environment 500. For example, the application usage count 338 may account for a number of PCI slots on each driver 524A-N used by the pods 510A-N running on the worker nodes 504A-N. In some embodiments, the PCI slot usage received from the collector service 540 may include the application usage count 338 or the notification 344 may be for any changes to the application usage count 338. Based on the allocated count 328 and the application usage count 338 the usage count module 334 may determine the usage count 336 for each of the worker nodes 504A-N. As can be appreciated, since the environment 500 is dynamic, the usage count 336 for each of the worker nodes 504A-N may also be dynamic, changing as the PCI slot usage needs of a respective application and system change.

Responsive to determining the usage count 336, the PCI engine 330 may determine an allocability count 350 for each of the worker nodes 504A-N(466). Specifically, the aggregator service 332 may include an allocability count module 346 for determining the allocability count 350 for each respective worker node. The allocability count 350 may be a number of PCI slots on a respective device driver 524A-N that is allocable by the scheduler 518. That is, the allocability count 350 may indicate the number of PCI slots available on a respective device driver 524A-N for scheduling.

To determine the allocability count 350 for a respective device driver 524A-N or respective worker node 504A-N, the allocability count module 346 may determine a capacity count 348 for each device driver (or worker node) (368). As noted above, the capacity of a respective device driver 524A-N may vary depending on the type of driver. As such, the PCI engine 330 may determine the driver type associated with a respective worker node 504A-N and then determine the capacity count 348 based on the driver type. For example, in some embodiments, a device driver 524A-N may have a fixed maximum number of PCI slots, such as the 440FX driver having a 32 PCI slot maximum. In such cases, the PCI engine 330 may determine the capacity count 348 for the respective device driver 324A-N as the maximum number of PCI slots for the device driver, here 32. In other embodiments, a device driver 524A-N may have no maximum limit of PCI slots, such as the q35 driver. In cases where the device driver 524A-N is a virtual driver and has no limit to the number of PCI slots, the PCI engine 330 may set a defined limit of PCI slots for the capacity count 348. For example, the PCI engine 330 may set the capacity count 348 for a device driver 524A-N based on the hardware resource/capacity of the respective driver, or based on predefined max (e.g., 64).

Once the capacity count 348 is determined for a respective device driver 524A-N, the allocability count module 346 may calculate the allocability count 350 based on the capacity count 348 (how many PCI slots are on the driver) and the usage count 336 (how many PCI slots are currently being used) (470). Again, as can be appreciated, as PCI slot usage may be dynamic within the environment 500, the allocability count 350 may be dynamic as well.

The PCI engine 330 may publish the allocability count 350 of a respective worker node 504A-N(472). Specifically, the PCI engine 330 may include a publisher 354 which may publish the PCI availability 356 for a respective worker node 504A-N such that the scheduler 518 can make scheduling decisions based on the node's allocability count 350. To publish the PCI availability 356 for the worker nodes 504A-N, the PCI engine 330 may update annotation metadata associated with each worker node 504A-N to reflect the allocability count 350 (474). In particular, the PCI engine 330 may include a metadata annotation generator 352 that may generate and/or update annotation metadata for each of the worker nodes 504A-N based on a respective node's allocability count 350.

During boot up or an update to the ConfigMap 342 for a respective worker node 504A-N, the PCI engine 330 may generate and/or set the node's annotation metadata to include a CapacityCount and an AllocabilityCount of the respective device driver 524A-N. The CapacityCount may include a maximum support capacity as configured through ConfigMap 342. The CapacityCount may be the same as the capacity count 348. The AllocabilityCount may be the total number of PCI slots that are available to be used by a respective application accounting for current usage. The AllocabilityCount may be the same as the allocability count 350. When the PCI engine 330 receives the notifications 344 from the collector service 540, the metadata annotation generator 352 may update the respective worker node's 504A-N annotation metadata to reflect the current usage. In particular, the AllocabilityCount may be updated to reflect the current allocability count 350 for the worker node 504A-N.

The publisher 354 may also update a respective worker node's 504A-N node status to reflect the current allocability count 350 (476). As those skilled in the art readily appreciate, a worker node's 504A-N status may provide information on the node's current condition and resource availability. The node status may include key health indicators, such as readiness and liveness states, showing whether the node is ready to accept new pods and is functioning correctly. The node status may also include an extended resource usage metric. The extended resource usage metric within a respective worker node's 504A-N status may provide information about non-standard resources such as GPUs, FPGAs, or custom hardware components, such as the device drivers 524A-N. The publisher 354 may update a respective worker nodes 504A-N extended resource capacity to equal the allocability count 350 to detail the node's current availability and consumption of external resources, complementing standard metrics like CPU and memory usage.

Once the PCI availability of each respective worker node 504A-N is published, the scheduler 518 may use this information to make informed scheduling decisions, ensuring that pods 510A-N requiring extended resources are placed on worker nodes 504A-N having sufficient capacity. By updating a respective worker node's 504A-N status with the allocability count 350, the PCI engine 330 enables efficient allocation of specialized hardware, optimizes workload performance, and ensures that resource constraints and requirements are met across the cluster 506.

Figure 6:
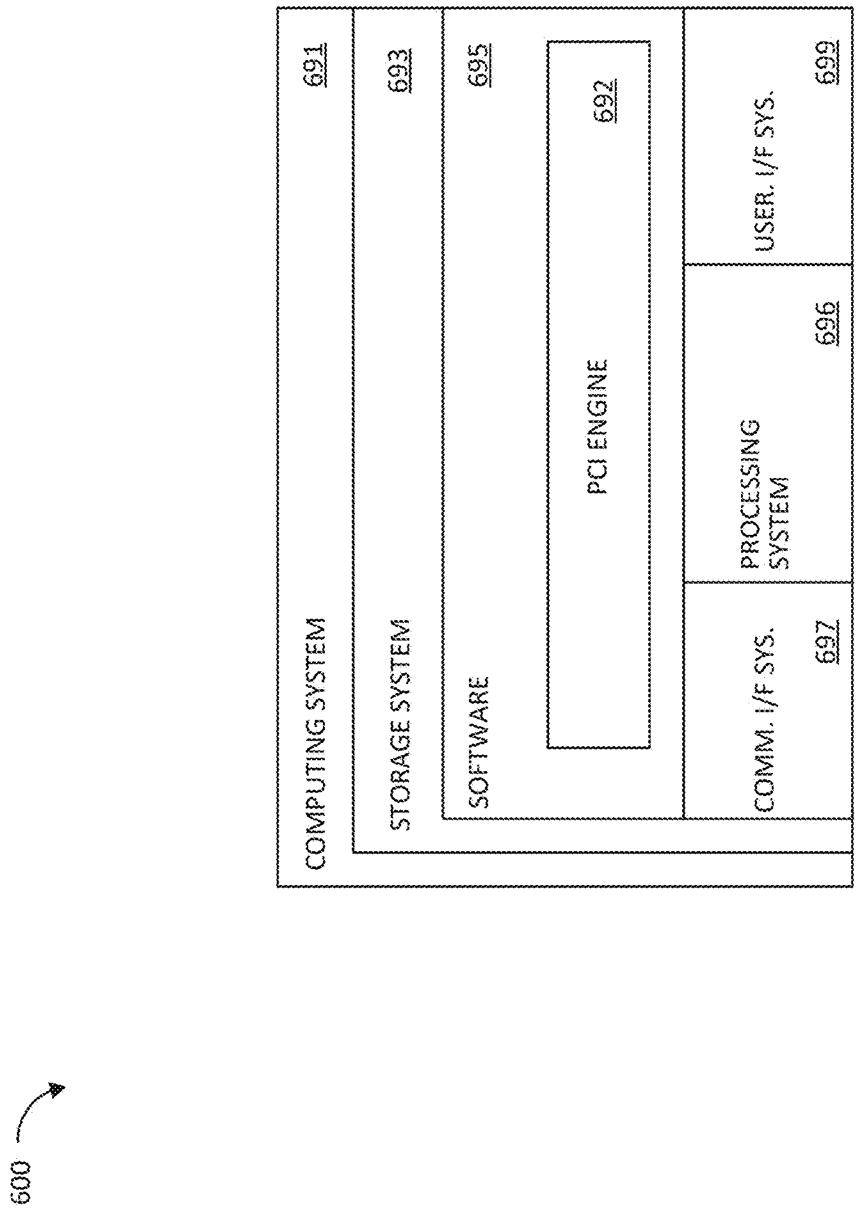
FIG. 6 shows an example computing device suitable for providing a PCI engine and its related functions, according to an embodiment herein.

Referring now to FIG. 6, a diagram of a system 600 configured to implement a PCI engine is provided, according to an embodiment herein. The system 600 may be an example of an apparatus including a computing apparatus 691 that is representative of any system or collection of systems in which the various processes, systems, programs, services, and scenarios disclosed herein may be implemented. For example, computing apparatus 691 may be an example of a PCI engine, such as the PCI engine 330, or any of the subcomponents depicted in system 300 of FIG. 3. Examples of computing apparatus 691 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 691 may be implemented as a single apparatus, system, or device or may be implemented in a distributed manner as multiple apparatuses, systems, or devices. Computing apparatus 691 may include, but is not limited to, processing system 696, storage system 693, software 695, communication interface system 697, and user interface system 699. Processing system 696 may be operatively coupled with storage system 693, communication interface system 697, and user interface system 699.

Processing system 696 may load and execute software 695 from storage system 693. Software 695 may include a PCI engine 692, which may be representative of any of the operations for providing a PCI engine or any of its related functions, as discussed with respect to the preceding figures. When executed by processing system 696, software 695 may direct processing system 696 to operate as described herein for at least the various processes, such as the process 400, operational scenarios, and sequences discussed in the foregoing implementations. Computing apparatus 691 may optionally include additional devices, features, or functionality not discussed for purposes of brevity.

In some embodiments, processing system 696 may comprise a micro-processor and other circuitry that retrieves and executes software 695 from storage system 693. Processing system 696 may be implemented within a single processing device but may also be distributed across multiple processing devices or sub-systems that cooperate in executing program instructions. Examples of processing system 696 may include general purpose central processing units, graphical processing units, application specific processors, and logic devices, as well as any other type of processing device, combinations, or variations thereof.

Storage system 693 may comprise any memory device or computer-readable storage medium readable by processing system 696 and capable of storing software 695. Storage system 693 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 693 may also include computer readable communication media over which at least some of software 695 may be communicated internally or externally. Storage system 693 may be implemented as a single storage device but may also be implemented across multiple storage devices or sub-systems co-located or distributed relative to each other. Storage system 693 may comprise additional elements, such as a controller, capable of communicating with processing system 696 or possibly other systems.

Software 695 (including the PCI engine 692 among other functions) may be implemented in program instructions that may, when executed by processing system 696, direct processing system 696 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 695 may include additional processes, programs, or components, such as operating system software, virtualization software, or other application software. Software 695 may also comprise firmware or some other form of machine-readable processing instructions executable by processing system 696.

In general, software 695 may, when loaded into processing system 696 and executed, transform a suitable apparatus, system, or device (of which computing apparatus 691 is representative) overall from a general-purpose computing system into a special-purpose computing system as described herein. Indeed, encoding software 695 on storage system 693 may transform the physical structure of storage system 693. The specific transformation of the physical structure may depend on various factors in different implementations of this description. Examples of such factors may include, but are not limited to, the technology used to implement the storage media of storage system 693 and whether the computer-storage media are characterized as primary or secondary storage, as well as other factors.

For example, if the computer-readable storage medium is implemented as semiconductor-based memory, software 695 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 697 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 691 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing a PCI engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a system including one or more processors; a memory having stored thereon instructions that, upon execution by the one or more processors, cause the one or more processors to implement a peripheral component interface (PCI) engine to manage availability of a plurality of external resources utilized by a plurality of worker nodes within a containerized software environment, wherein the plurality of external resources is provided to respective worker nodes through a plurality of PCI slots, the process including: determine a usage count for each worker node within the plurality of worker nodes, wherein the usage count comprises a number of PCI slots of the plurality of PCI slots for a respective worker node consumed by the plurality of external resources; determine an allocability count for a first worker node of the plurality of worker nodes based on the usage count; and publish a PCI availability of the first worker node to a scheduler associated with the containerized software environment based on the allocability count.

Example 2 is the system of any previous or subsequent Example, wherein the instructions to determine the usage count for each worker node within the plurality of worker nodes, upon execution, further cause the one or more processors to: deploy a collector service for monitoring PCI usage counts on each respective worker nodes of the plurality of worker nodes, wherein the collector service, once deployed, executes on each respective worker node of the plurality of worker nodes to: monitor a host path associated with a respective worker node for PCI slot usage; generate a notification responsive to detecting a change to the PCI slot usage; and transmit the notification indicating the change to the PCI slot usage to an aggregator service.

Example 3 is the system of any previous or subsequent Example, wherein the instructions to determine the usage count for each worker node within the plurality of worker nodes, upon execution, further cause the one or more processors to: detect addition of a first external resource at the first worker node of the plurality of worker nodes; determine an updated capacity count for the first worker node based on the addition of the first external resource, wherein the updated capacity count indicates a current number of PCI slots of the plurality of PCI slots that are available on the first worker node; and update the usage count for the first worker node based on the updated capacity count.

Example 4 is the system of any previous or subsequent Example, wherein the instructions to determine the usage count for each worker node of the plurality of worker nodes, upon execution, further cause the one or more processors to: receive, from a collector service deployed within the containerized software environment, the usage count for each of the plurality of worker nodes; and calculate the allocability count for each of the plurality of worker nodes based on the usage count.

Example 5 is the system of any previous or subsequent Example, further comprising instructions that, upon execution, cause the one or more processors to: determine a driver type associated with the plurality of PCI slots for a respective worker node of the plurality of worker nodes; determine a capacity count for the respective worker node based on the driver type; and determine the allocability count for the respective worker node based on the capacity count.

Example 6 is the System of any previous or subsequent Example, wherein the containerized software environment comprises a Kubernetes cluster.

Example 7 is the system of any previous or subsequent Example, wherein the instructions to publish the PCI availability of the first worker node to the scheduler associated with the containerized software environment, upon execution, further cause the one or more processors to: update annotation metadata associated with the first worker node with the allocability count; and update an extended resource capacity associated with the first worker node with the allocability count.

Example 8 is a method for managing availability of a plurality of external resources utilized by a plurality of worker nodes within a containerized software environment, wherein the plurality of external resources is provided to respective worker nodes through a plurality of peripheral component interface (PCI) slots, the method comprising: determining, by a PCI engine, a usage count for each worker node within the plurality of worker nodes, wherein the usage count comprises a number of PCI slots of the plurality of PCI slots for a respective worker node consumed by the plurality of external resources; determining, by the PCI engine, an allocability count for a first worker node of the plurality of worker nodes based on the usage count; and publishing, by the PCI engine, a PCI availability of the first worker node to a scheduler associated with the containerized software environment based on the allocability count.

Example 9 is the method of any previous or subsequent Example, wherein determining, by the PCI engine, the usage count for each worker node within the plurality of worker nodes comprises: creating, by the PCI engine, a ConfigMap for each worker node, wherein the ConfigMap comprises a host path for each respective worker node and a capacity count of the worker node, wherein the capacity count comprises a total number of PCI slots on a respective driver; and deploying, by the PCI engine, a collector service for monitoring the usage count on each respective worker nodes of the plurality of worker nodes, wherein the collector service, once deployed, executes on each respective worker node of the plurality of worker nodes to: monitor the host path of the first worker node for PCI slot usage; generate a notification responsive to detecting a change to the PCI slot usage; and transmit the notification indicating the change to the PCI slot usage the PCI engine.

Example 10 is the method of any previous or subsequent Example, wherein the usage count for each respective worker node comprises an allocated count and an application usage count, and the method determining, by the PCI engine, the usage count for each worker node of the plurality of worker nodes comprises: determining, by the PCI engine, the allocated count for a respective worker node, wherein the allocated count comprises a subset of the number of PCI slots consumed by a respective platform; and determining, by the PCI engine, the application usage count for a respective worker node, wherein the application usage count comprises a second subset of the number of PCI slots consumed by an application pod executing on the respective worker node.

Example 11 is the method of any previous or subsequent Example, wherein determining, by the PCI engine, the usage count for each worker node of the plurality of worker nodes comprises: receiving, by the PCI engine, the usage count for each of the plurality of worker nodes from a collector service deployed within the containerized software environment; and calculating, by the PCI engine, the allocability count for each of the plurality of worker nodes based on the usage count.

Example 12 is the method of any previous or subsequent Example, wherein, responsive to receiving the PCI availability, the scheduler associated with the containerized software environment schedules at least one pod on the first worker node based on the PCI availability.

Example 13 is the method of any previous or subsequent Example, wherein publishing, by the PCI engine, the PCI availability of the first worker node to the scheduler associated with the containerized software environment comprises: updating, by the PCI engine, annotation metadata associated with the first worker node with the allocability count.

Example 14 is the method of any previous or subsequent Example, wherein the containerized software environment comprises a Kubernetes cluster.

Example 15 is the method of any previous or subsequent Example, wherein the method further comprises: generating, by the PCI engine, a capacity count annotation for each worker node of the plurality of worker nodes; generating, by the PCI engine, an allocability count annotation for each worker node of the plurality of worker nodes; and adding, by the PCI engine, the capacity count annotation and the allocability count annotation to metadata associated with each respective worker node of the plurality of worker nodes.

Example 16 is a computer-readable storage medium comprising processor-executable instructions, wherein the processor-executable instructions comprise a peripheral component interface (PCI) engine that manages availability of a plurality of external resources utilized by a plurality of worker nodes within a containerized software environment, wherein the plurality of external resources is provided to respective worker nodes through a plurality of PCI slots, wherein the PCI engine is configured to cause one or more processors to: determine a usage count for each worker node within the plurality of worker nodes, wherein the usage count comprises a number of PCI slots of the plurality of PCI slots for a respective worker node consumed by the plurality of external resources; determine an allocability count for a first worker node of the plurality of worker nodes based on the usage count; and publish a PCI availability of the first worker node to a scheduler associated with the containerized software environment based on the allocability count.

Example 17 is the computer-readable storage medium of any previous or subsequent Example, wherein the PCI engine comprises an aggregator service, and wherein the processor-executable instructions of the PCI engine to determine the usage count for each worker node within the plurality of worker nodes cause the one or more processors to further execute processor-executable instructions stored in the computer-readable storage medium to: create a ConfigMap for each worker node, wherein the ConfigMap comprises a host path for each respective worker node and a capacity count of the worker node, wherein the capacity count comprises a total number of PCI slots on a respective driver; and deploy a collector service for monitoring the usage count on each respective worker nodes of the plurality of worker nodes, wherein the collector service, once deployed, executes on each respective worker node of the plurality of worker nodes to: monitor the host path of the first worker node for PCI slot usage; generate a notification responsive to detecting a change to the PCI slot usage; and transmit the notification indicating the change to the PCI slot usage to the aggregator service.

Example 18 is the computer-readable storage medium of any previous or subsequent Example, wherein the processor-executable instructions of the PCI engine to determine the usage count for each worker node within the plurality of worker nodes cause the one or more processors to further execute processor-executable instructions stored in the computer-readable storage medium to: detect removal of a first external resource at the first worker node of the plurality of worker nodes; determine an updated capacity count for the first worker node based on removal of the first external resource, wherein the updated capacity count indicates a current number of PCI slots of the plurality of PCI slots that are available on the first worker node; and update the usage count for the first worker node based on the updated capacity count.

Example 19 is the computer-readable storage medium of any previous or subsequent Example, wherein the usage count for each respective worker node comprises an allocated count and an application usage count, and the processor-executable instructions to determine the usage count for each worker node of the plurality of worker nodes cause the one or more processors to further execute processor-executable instructions stored in the computer-readable storage medium to: determine the allocated count for a respective worker node, wherein the allocated count comprises a subset of the number of PCI slots consumed by a respective platform; and determine the application usage count for a respective worker node, wherein the application usage count comprises a second subset of the number of PCI slots consumed by an application pod executing on the respective worker node.

Example 20 is the computer-readable storage medium of any previous or subsequent Example, wherein the processor-executable instructions of the PCI engine to publish the PCI availability of the first worker node to the scheduler associated with the containerized software environment cause the one or more processors to further execute processor-executable instructions stored in the computer-readable storage medium to: update extended resource capacity associated with the first worker node with the allocability count.

What is claimed is:

1. A system, comprising:

one or more processors;

a memory having stored thereon instructions that, upon execution by the one or more processors, cause the one or more processors to implement a peripheral component interface (PCI) engine to manage availability of a plurality of external resources utilized by a plurality of worker nodes within a containerized software environment, wherein the plurality of external resources is provided to respective worker nodes through a plurality of PCI slots, the process including:

determine a usage count for each worker node within the plurality of worker nodes, wherein the usage count comprises a number of PCI slots of the plurality of PCI slots for a respective worker node consumed by the plurality of external resources;

determine an allocability count for a first worker node of the plurality of worker nodes based on the usage count; and publish a PCI availability of the first worker node to a scheduler associated with the containerized software environment based on the allocability count.

2. The system of claim 1, wherein the instructions to determine the usage count for each worker node within the plurality of worker nodes, upon execution, further cause the one or more processors to:

deploy a collector service for monitoring PCI usage counts on each respective worker nodes of the plurality of worker nodes, wherein the collector service, once deployed, executes on each respective worker node of the plurality of worker nodes to:

monitor a host path associated with a respective worker node for PCI slot usage;

generate a notification responsive to detecting a change to the PCI slot usage; and transmit the notification indicating the change to the PCI slot usage to an aggregator service.

3. The system of claim 1, wherein the instructions to determine the usage count for each worker node within the plurality of worker nodes, upon execution, further cause the one or more processors to:

detect addition of a first external resource at the first worker node of the plurality of worker nodes;

determine an updated capacity count for the first worker node based on the addition of the first external resource, wherein the updated capacity count indicates a current number of PCI slots of the plurality of PCI slots that are available on the first worker node; and update the usage count for the first worker node based on the updated capacity count.

4. The system of claim 1, wherein the instructions to determine the usage count for each worker node of the plurality of worker nodes, upon execution, further cause the one or more processors to:

receive, from a collector service deployed within the containerized software environment, the usage count for each of the plurality of worker nodes; and calculate the allocability count for each of the plurality of worker nodes based on the usage count.

5. The system of claim 1, further comprising instructions that, upon execution, cause the one or more processors to:

determine a driver type associated with the plurality of PCI slots for a respective worker node of the plurality of worker nodes;

determine a capacity count for the respective worker node based on the driver type; and determine the allocability count for the respective worker node based on the capacity count.

6. The System of claim 1, wherein the containerized software environment comprises a Kubernetes cluster.

7. The system of claim 1, wherein the instructions to publish the PCI availability of the first worker node to the scheduler associated with the containerized software environment, upon execution, further cause the one or more processors to:

update annotation metadata associated with the first worker node with the allocability count; and update an extended resource capacity associated with the first worker node with the allocability count.

8. A method for managing availability of a plurality of external resources utilized by a plurality of worker nodes within a containerized software environment, wherein the plurality of external resources is provided to respective worker nodes through a plurality of peripheral component interface (PCI) slots, the method comprising:

determining, by a PCI engine, a usage count for each worker node within the plurality of worker nodes, wherein the usage count comprises a number of PCI slots of the plurality of PCI slots for a respective worker node consumed by the plurality of external resources;

determining, by the PCI engine, an allocability count for a first worker node of the plurality of worker nodes based on the usage count; and publishing, by the PCI engine, a PCI availability of the first worker node to a scheduler associated with the containerized software environment based on the allocability count.

9. The method of claim 8, wherein determining, by the PCI engine, the usage count for each worker node within the plurality of worker nodes comprises:

creating, by the PCI engine, a ConfigMap for each worker node, wherein the ConfigMap comprises a host path for each respective worker node and a capacity count of the worker node, wherein the capacity count comprises a total number of PCI slots on a respective driver; and deploying, by the PCI engine, a collector service for monitoring the usage count on each respective worker nodes of the plurality of worker nodes, wherein the collector service, once deployed, executes on each respective worker node of the plurality of worker nodes to:

monitor the host path of the first worker node for PCI slot usage;

generate a notification responsive to detecting a change to the PCI slot usage; and transmit the notification indicating the change to the PCI slot usage the PCI engine.

10. The method of claim 8, wherein the usage count for each respective worker node comprises an allocated count and an application usage count, and the method determining, by the PCI engine, the usage count for each worker node of the plurality of worker nodes comprises:

determining, by the PCI engine, the allocated count for a respective worker node, wherein the allocated count comprises a subset of the number of PCI slots consumed by a respective platform; and determining, by the PCI engine, the application usage count for a respective worker node, wherein the application usage count comprises a second subset of the number of PCI slots consumed by an application pod executing on the respective worker node.

11. The method of claim 8, wherein determining, by the PCI engine, the usage count for each worker node of the plurality of worker nodes comprises:

receiving, by the PCI engine, the usage count for each of the plurality of worker nodes from a collector service deployed within the containerized software environment; and calculating, by the PCI engine, the allocability count for each of the plurality of worker nodes based on the usage count.

12. The method of claim 8, wherein, responsive to receiving the PCI availability, the scheduler associated with the containerized software environment schedules at least one pod on the first worker node based on the PCI availability.

13. The method of claim 8, wherein publishing, by the PCI engine, the PCI availability of the first worker node to the scheduler associated with the containerized software environment comprises:

updating, by the PCI engine, annotation metadata associated with the first worker node with the allocability count.

14. The method of claim 8, wherein the containerized software environment comprises a Kubernetes cluster.

15. The method of claim 8, wherein the method further comprises:

generating, by the PCI engine, a capacity count annotation for each worker node of the plurality of worker nodes;

generating, by the PCI engine, an allocability count annotation for each worker node of the plurality of worker nodes; and adding, by the PCI engine, the capacity count annotation and the allocability count annotation to metadata associated with each respective worker node of the plurality of worker nodes.

16. A computer-readable storage medium comprising processor-executable instructions, wherein the processor-executable instructions comprise a peripheral component interface (PCI) engine that manages availability of a plurality of external resources utilized by a plurality of worker nodes within a containerized software environment, wherein the plurality of external resources is provided to respective worker nodes through a plurality of PCI slots, wherein the PCI engine is configured to cause one or more processors to:

determine a usage count for each worker node within the plurality of worker nodes, wherein the usage count comprises a number of PCI slots of the plurality of PCI slots for a respective worker node consumed by the plurality of external resources;

determine an allocability count for a first worker node of the plurality of worker nodes based on the usage count; and publish a PCI availability of the first worker node to a scheduler associated with the containerized software environment based on the allocability count.

17. The computer-readable storage medium of claim 16, wherein the PCI engine comprises an aggregator service, and wherein the processor-executable instructions of the PCI engine to determine the usage count for each worker node within the plurality of worker nodes cause the one or more processors to further execute processor-executable instructions stored in the computer-readable storage medium to:

create a ConfigMap for each worker node, wherein the ConfigMap comprises a host path for each respective worker node and a capacity count of the worker node, wherein the capacity count comprises a total number of PCI slots on a respective driver; and deploy a collector service for monitoring the usage count on each respective worker nodes of the plurality of worker nodes, wherein the collector service, once deployed, executes on each respective worker node of the plurality of worker nodes to:

monitor the host path of the first worker node for PCI slot usage;

generate a notification responsive to detecting a change to the PCI slot usage; and transmit the notification indicating the change to the PCI slot usage to the aggregator service.

18. The computer-readable storage medium of claim 16, wherein the processor-executable instructions of the PCI engine to determine the usage count for each worker node within the plurality of worker nodes cause the one or more processors to further execute processor-executable instructions stored in the computer-readable storage medium to:

detect removal of a first external resource at the first worker node of the plurality of worker nodes;

determine an updated capacity count for the first worker node based on removal of the first external resource, wherein the updated capacity count indicates a current number of PCI slots of the plurality of PCI slots that are available on the first worker node; and update the usage count for the first worker node based on the updated capacity count.

19. The computer-readable storage medium of claim 16, wherein the usage count for each respective worker node comprises an allocated count and an application usage count, and the processor-executable instructions to determine the usage count for each worker node of the plurality of worker nodes cause the one or more processors to further execute processor-executable instructions stored in the computer-readable storage medium to:

determine the allocated count for a respective worker node, wherein the allocated count comprises a subset of the number of PCI slots consumed by a respective platform; and determine the application usage count for a respective worker node, wherein the application usage count comprises a second subset of the number of PCI slots consumed by an application pod executing on the respective worker node.

20. The computer-readable storage medium of claim 16, wherein the processor-executable instructions of the PCI engine to publish the PCI availability of the first worker node to the scheduler associated with the containerized software environment cause the one or more processors to further execute processor-executable instructions stored in the computer-readable storage medium to:

update extended resource capacity associated with the first worker node with the allocability count.

* * * * *